Jan. 29, 1963

M. KADEN 3,075,651

TRANSFER DEVICE

Filed March 7, 1961

9 Sheets-Sheet 1

INVENTOR.
MILTON KADEN
BY Sanford Schnurmacher
ATTORNEY.

INVENTOR.
MILTON KADEN
BY Sanford Schnurmacher
ATTORNEY.

INVENTOR.
MILTON KADEN
BY Sanford Schnurmacher
ATTORNEY.

INVENTOR.
MILTON KADEN
BY Sanford Schnurmacher
ATTORNEY

INVENTOR.
MILTON KADEN
BY
Sanford Schnurmacher
ATTORNEY.

TRANSFER DEVICE

Filed March 7, 1961 9 Sheets-Sheet 6

INVENTOR.
MILTON KADEN

BY Sanford Schnurmacher
ATTORNEY.

INVENTOR.
MILTON KADEN
BY Sanford Schnurmacher
ATTORNEY.

INVENTOR.
MILTON KADEN
BY Sanford Schnurmacher
ATTORNEY.

Jan. 29, 1963 M. KADEN 3,075,651

TRANSFER DEVICE

Filed March 7, 1961 9 Sheets-Sheet 9

INVENTOR.
MILTON KADEN
BY Sanford Schnurmacher
ATTORNEY.

United States Patent Office 3,075,651
Patented Jan. 29, 1963

3,075,651

TRANSFER DEVICE

Milton Kaden, Cleveland, Ohio, assignor to Valen Manufacturing Co., Cleveland, Ohio Filed Mar. 7, 1961, Ser. No. 93,896
2 Claims. (Cl. 214—1)

This invention relates to a transfer device and more particularly to a device designed to move work-pieces progressively through a plurality of spaced stations arranged in a linear path. The transfer device of the present invention is particularly adapted for use with punch presses or machines having a plurality of stations thereon for progressively forming a workpiece.

Conducive to a better understanding of the invention, it may be well to point out that the fabrication of sheet metal electric switch boxes, such as commonly used with conduit wiring systems, requires the formation of a hollow, 5-sided box, open to the front, as seen when properly installed. A metal cover is positioned over the open face, of a shape and configuration suitable for the type of switch or switches, supported within a box. The walls of the box are provided with a plurality of so-called "knock-out" elements which permit mounting of the conduit pipe through the box walls at selected locations.

In order to form the hollow box from a web of sheet steel, it is roughly shaped over an upstanding stake or mandrel and then must be lifted off the stake and replaced on and removed from a succession of similar supporting mandrels at each station, as the various "knock-out" sections and other required shaping operations are taken, to form the finished box.

These press operations could not be co-ordinated, heretofore, because the box blanks have to be lifted off each stake, or mandrel, and then re-fitted in place on the mandrel at the next station.

While there are many types of transfer conveyors for moving work-pieces from one station to another on the bed of a machine tool, they all operate along a single flat plane.

The primary object of this invention, therefore, is to provide a transfer device that can move the work-piece vertically as well as horizontally relative to successive co-planer stations.

Another object is to provide a device of the type stated, having clamping fingers adapted to grasp, lift and move the work-piece between successive stations in a plane above that normally occupied by the work-piece when it is being worked upon by the associated machine tool.

A further object is to provide a transfer device for hollow work-pieces, open to the bottom, that can lift the work-piece off and on successive work stations having upstanding elements over which the work-piece is fitted during the forming operations of the machine tool.

Another object is to provide a transfer device whose work-piece, engaging elements are entirely clear and free of the machine tool during the working cycle thereof.

Another object is to provide such a device whose operational steps are controlled by a cyclic mechanical and electric circuit, requiring no manual supervision.

Still another object is to provide such a device that is integrated with the movements of its associated machine tool so that it only operates when the machine tool is in its in-operative position and vice-versa.

These, and other objects of the invention will become apparent from a reading of the following specification and claims, together with the accompanying drawings, wherein like parts are referred to and indicated by like reference numerals, and wherein:

Figure 1:
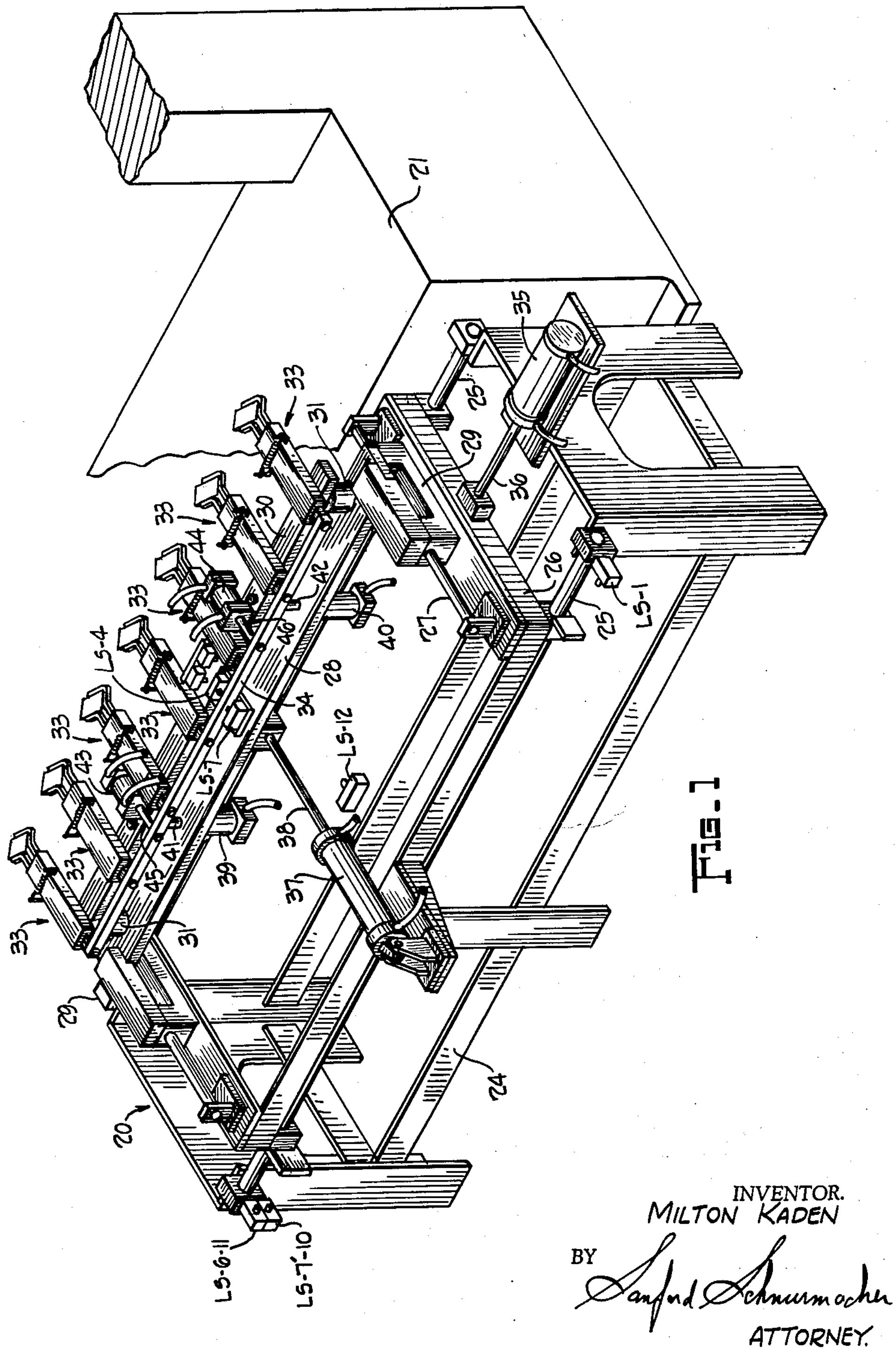
FIGURE 1 is a perspective view of the transfer table that is the subject of this invention, showing it in operational engagement with the machine tool with which it is associated.

Referring more particularly to the drawings, there is seen in FIGURE 1 the transfer device that is the subject of this invention, broadly indicated by reference numeral 20.

For purposes of description, and not by limitation, the transfer device 20 is illustrated in connection with a punch press 21, having 7 work stations. For operation with such a set-up, the transfer device 20 illustrated is provided with seven work-piece clamp units broadly indicated by reference numeral 33.

Furthermore, for purpose of illustration the work-piece 23 is a so-called commercial electric switch box for wall mounting, as described hereinabove.

The transfer device 20 comprises a rectangular base or frame 24 which extends lengthwise of the punch press 21. Two longitudinally extending tracks 25 are mounted at the front, rear edges of the frame 24. A first, or base table 26 is slidably mounted on the tracks 25. This table is slidable longitudinally of the tracks 25 a distance equal to the spacing between adjacent punch press stations 22.

A second, or cross-slide table 28 is slidably mounted on tubular track 27 extending cross-wise of the table 26. The table 28 is slidable on its bearing blocks 29 toward and away from the press 21.

A third, or vertical lift, table 30 is mounted on table 28 by means of vertical slide rods 32, which are held in vertical bearing post 31.

An air cylinder 35 is mounted at the right end of the frame 24 and is connected to the base table 26 through its piston rod 36. Table 26 is movable longitudinally of the frame by operation of the cylinder 35. An air cylinder 37, mounted on base table 26, is connected to the cross-slide table 28 by its piston rod 38. The cylinder 37 acts to move the table 28 cross-wise of both the frame 24 and base table 26, toward and away from the bed of the punch press 21.

Two air cylinders 39 and 40 are mounted vertically on the underside of table 28 with their vertical piston rods 41 and 42, respectively, connected to the table 30 whereby the table 30 can be moved vertically relative to table 30.

Seven clamp units 33 are mounted cross-wise of the vertical lift table 30 with their work-piece engaging fingers extended outward toward the punch press 21. The clamp units are connected through a common control bar 34, whereby all the clamps may be simultaneously opened or closed. The bar 34 is moved between operational positions by means of two air cylinders 43 and 44, mounted on table 30 and connected to the bar 34 through their piston rods 45 and 46, respectively.

Each clamp unit 33 comprises a case 47, open at both ends. Two clamp arms 48 and 49 are pivotally mounted in the case through pivot pins 58. The forward ends of the arms have jaws 56 of a shape to fit and clamp against opposite sides of the work-piece. The configuration of the jaws may be varied to accommodate work-pieces of different contour and size.

Figures 7, 13, 14:
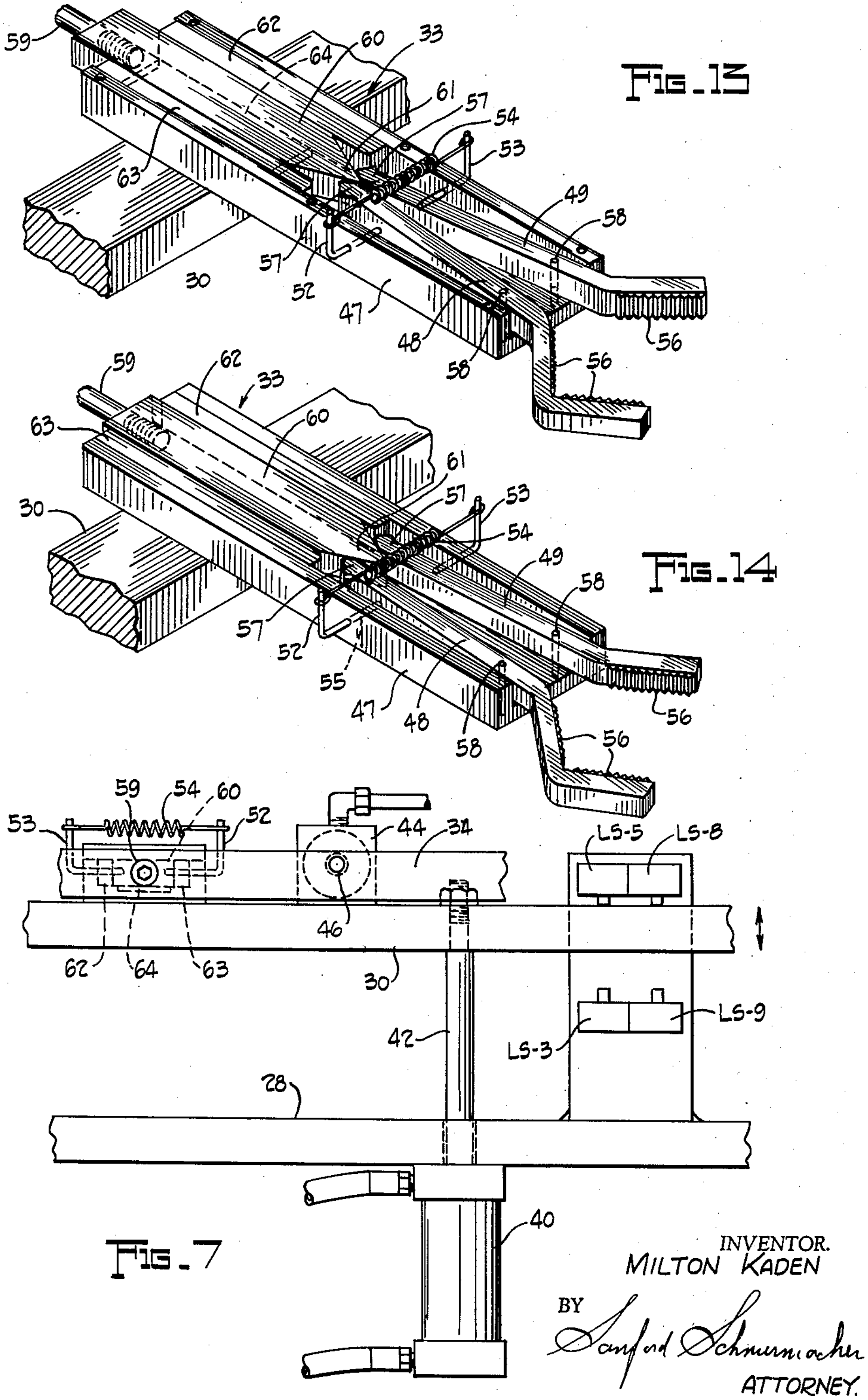
FIGURE 7 is a longitudinal view of the cross-slide table taken along the line and in the direction of arrows 7—7 of FIGURE 2.
FIGURE 13 is a perspective view of one of the clamp units with its closure cover removed, showing the clamp arms in their open position.
FIGURE 14 is a perspective view of the same, showing the clamp arms in their closed position.
Figure 8:
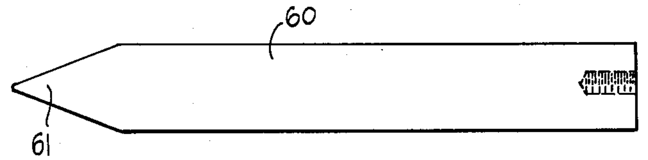
FIGURE 8 is a top plan view of one of the finger clamping cams.
Figure 9:
FIGURE 9 is a right end view of same.
Figure 10:
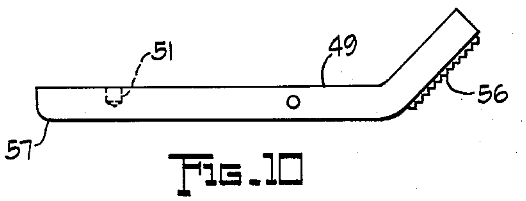
FIGURE 10 is a top plan view of one of the two co-operating arms in each clamp member.
Figures 11, 12:
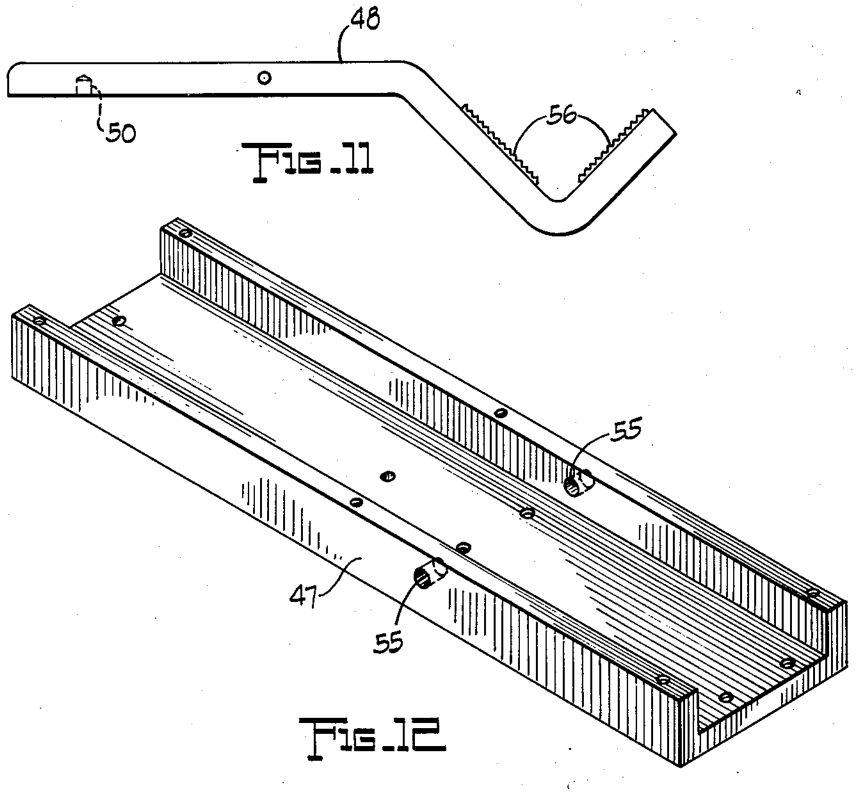
FIGURE 11 is a top plan view of the other of the said co-operating arms.
FIGURE 12 is a perspective view of the clamp case with its closure top and operational mechanism removed.

The inner ends 57 of the arms are curved to make gliding point contact with the triangular, camming surface 61 of jaw operating cam 60, which is slidably mounted in the case between nylon bearing elements 62, 63 and 64, as seen in FIGURES 7, 13 and 14.

Reference numeral 59 indicates a rod which connects the rear end of the cam 60 with the clamp activating bar 34.

The camming ends 57 of the arms 48 and 49 are biased against the operating surfaces 61 of the cam 60 by means of a spring 54. The spring 54 is mounted between two supports 52 and 53 which are anchored in holes 50 and 51 in the arms 48 and 49 respectively. The supports 52 and 53 extend through bores 55 in the side walls of case 47.

When the cam 60 is in its first position, as illustrated in FIGURE 13, the cam tip 61 is to the rear of the arm ends 57, which are urged together by the spring 54. When the cam 60 is in this first position, the gripping fingers 56 of the arms 48 and 49 are in their first, or open position.

Referring to FIGURE 14, the gripping fingers 56 are shown in their second, or clamping position. It will be seen that the finger ends 56 of the arms have been pivoted toward each other on the pivot pins 58 due to the travel of the cam 60 to its second position, wherein its camming surface 61 is located between the arm ends 57 which are thereby spread apart against the biasing action of the spring 54.

Figure 16:
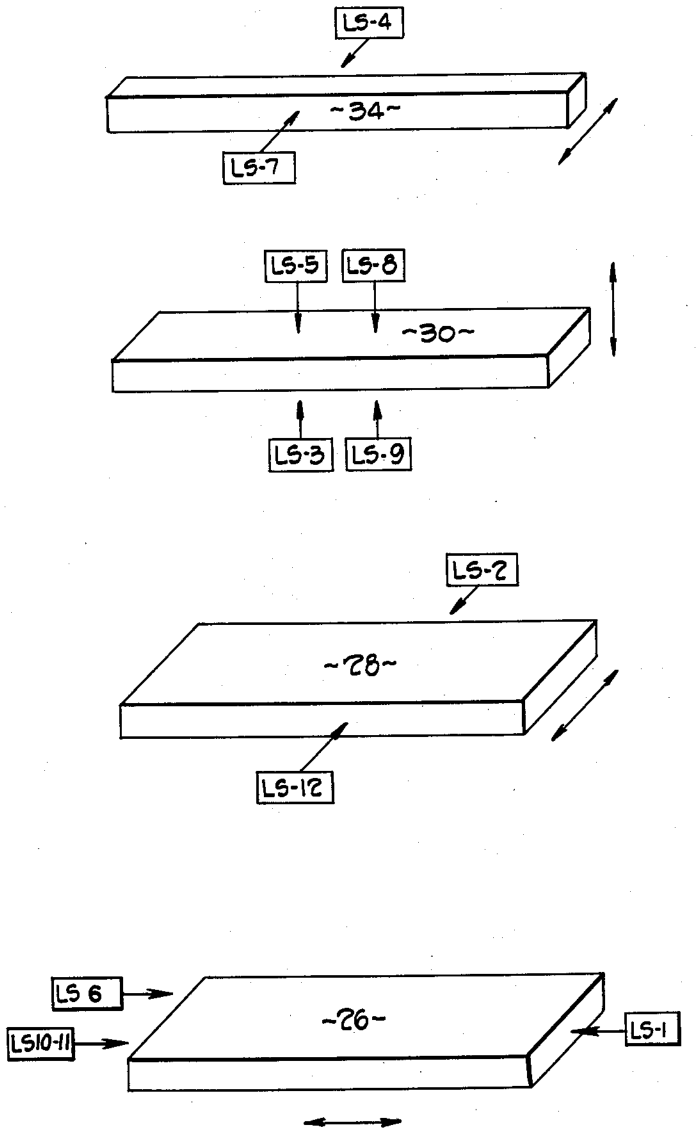
FIGURE 16 is a schematic, mechanical layout of the limit switches showing their relation to their activating elements.

In view of the fact that eight major movements of the various structural elements that support and activate the work-piece engaging clamp units 33 take place in predetermined sequence during each transfer cycle, it is thought that a schematic layout of these movements, such as illustrated in FIGURE 16 would be helpful.

Referring to FIGURE 16, it will be seen that base table 26 is movable back and forth in a horizontal plane between a first position, wherein it is at the extreme right end of the frame 24, and a second position wherein it is at the extreme left end of the frame 24.

Cross-slide table 28 is movable in a horizontal plane crosswise of table 26 between a first position wherein it retracted away from the machine tool 21, and a second position wherein it is extended toward the machine tool 21.

The table 30 is movable in a vertical plane between a first position wherein it is raised from the table 28, and a second position wherein it is lowered toward the table 28.

The cam bar 34 is movable in a horizontal plane toward or away from the clamp units 33, which are mounted on the table 30, between a first position, wherein it is positioned away from the clamp units to move the cams 60 to their first positions, as defined hereinabove, and a second position wherein it is positioned close to the units 33 to move the said cams 60 to their second positions.

Figure 15:
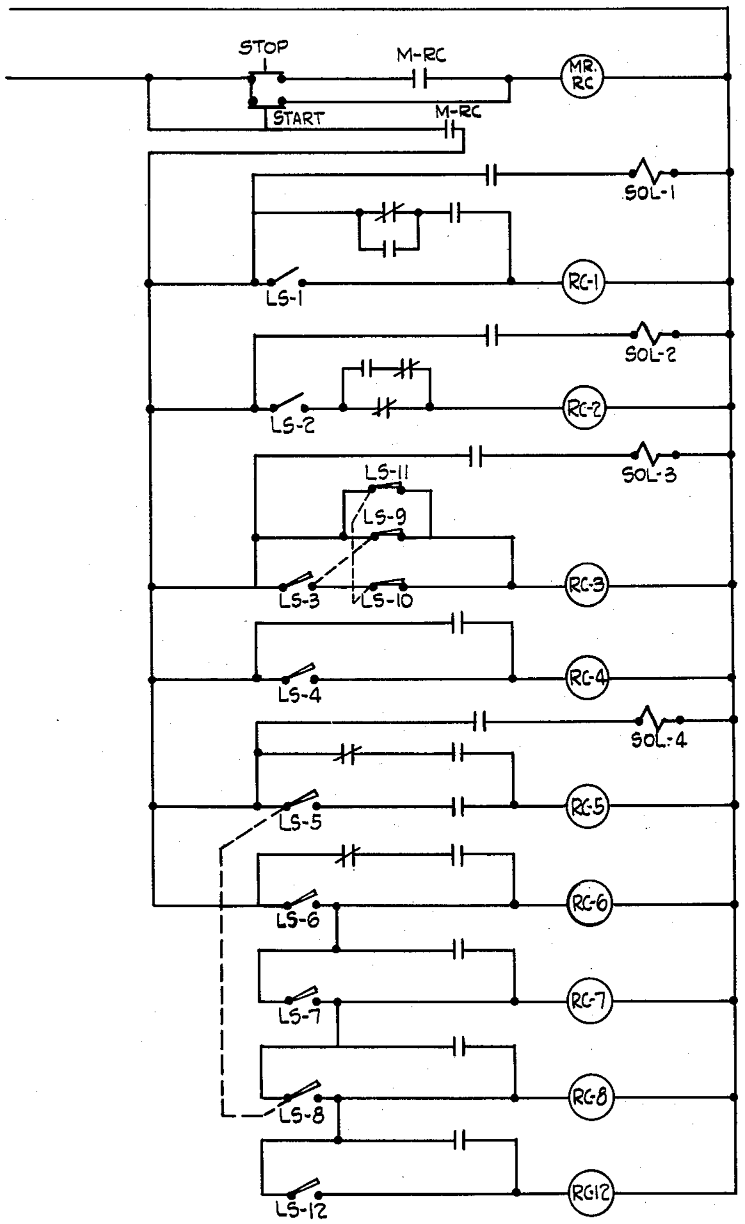
FIGURE 15 is a schematic layout of the electrical control circuits.

Referring to FIGURE 15, there is seen a schematic layout of the electrical control circuit whereby the sequential activation of the operational air cylinders 35, 37, 39, 40, 43 and 44 is automatically effected, once the cycle is started, to transfer the work-pieces 23 from station to station. This circuit contains 12 limit switches identified by reference numerals LS–1, to LS–12, inclusive, which are mechanically tripped by the movements of structural elements 26, 28, 30 and 34, as is seen most clearly in FIGURE 16. The various limit switches are positioned on the machine 20 so as to be tripped when the various moving elements arrive at a desired, pre-determined location.

The various air cylinders are controlled by solenoid air valves, of the conventional type, and identified in FIGURE 15 by reference characters SOL–1, SOL–2, SOL–3 and SOL–4.

Figure 3:
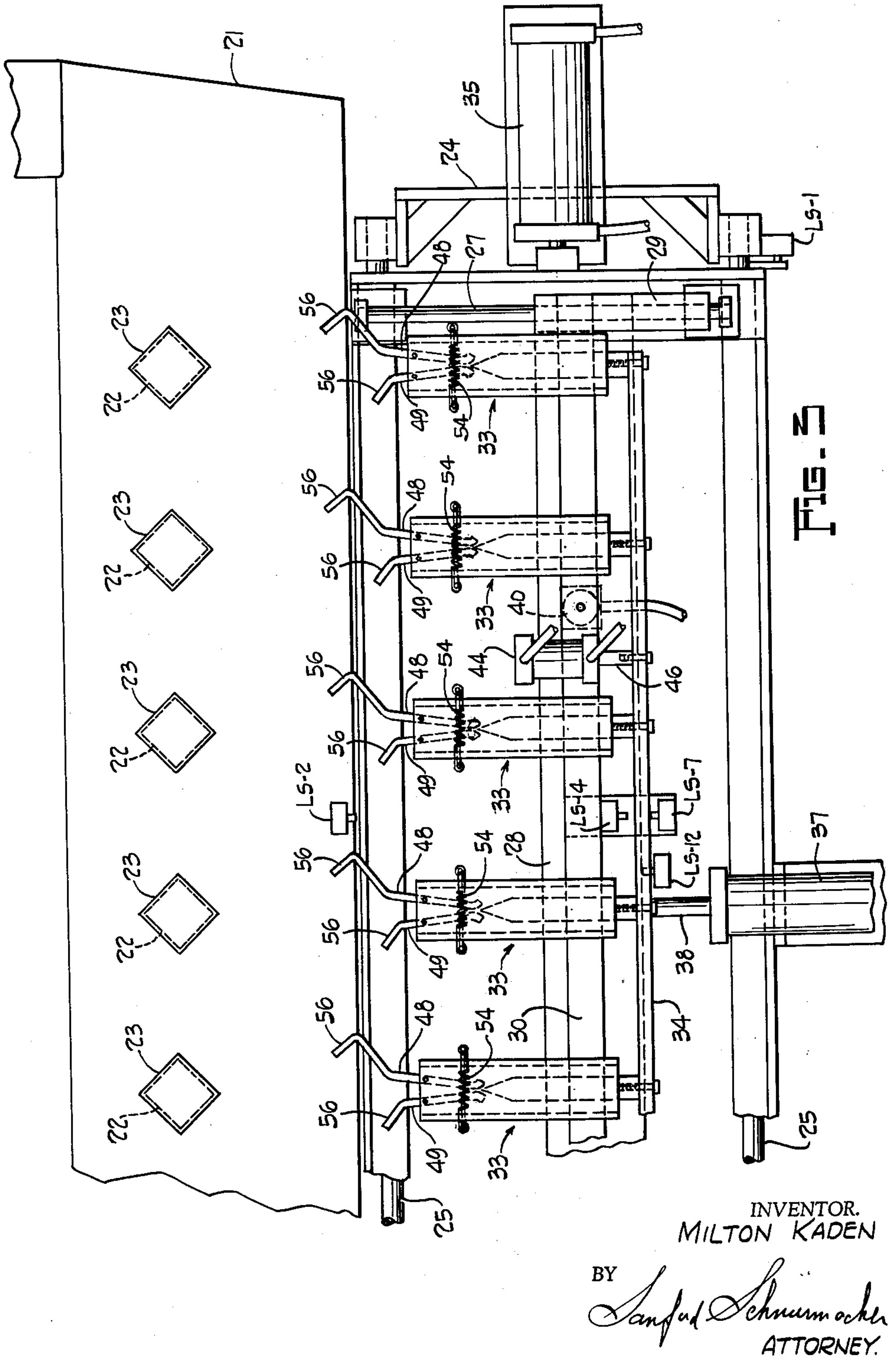
FIGURE 3 is a top view of the right portion of the device showing the work-piece transfer fingers in their maximum withdrawn, retracted and open position.

The operation of the transfer device 20 when used with a punch press on the type having a bed 21 on which is mounted a die set 65 having seven linearly disposed, spaced stations 22, as seen in FIGURES 1, 2, 3 and 4, is as follows:

At the start of the transfer cycle, with the machine tool at rest, as illustrated in FIGURE 3, the base table 26 is in its first position with the limit switch LS–1 tripped. Cross-slide table 28 is in its retracted or first postion with the limit switch LS–12 tripped. Clamp unit supporting table 30 is in its raised, or first position with the limit-switches LS–5 and LS–8 tripped.

Cam bar 34 is in its first position wherein the clamp arms 48 and 49 are in their open position. In its first position, the cam bar 34 trips the limit switch LS–7.

It will thus be evident that at the start of the cycle, the clamp arms 48 and 49 are drawn back and away from the press bed 21 and entirely clear and above the horizontal plane of the die stations 22. At the same time the right end clamp unit 33 is aligned with the extreme right end station 22 of the press 21, and as a consequence all the six other clamp units are aligned with the other six stations.

As a safety precaution, the operating electric circuits of the punch press 21 and the transfer device 20 are interlocked so that the master relay circuit, M–RC, will permit operation of the punch press 21 only when the cross-slide table 28 and its supported clamping unit arms are in their first positions, that is, drawn away from and clear of the die station work areas.

To start the transfer cycle, the "start" switch, as seen in FIGURE 15, is closed. This sends current through limit switch LS–1, which is already tripped by reason of the base table 26 being in its first position, as seen in FIGURE 3.

Limit switch LS–1 energizes relay circuit RC–1 which in turn energizes solenoid air valve SOL–1 of air cylinder 37 causing the cross-slide table 28 to be pushed to its advanced, or second, position, wherein the clamp arm gripper jaws 56 are above and aligned with the die stations 22.

At the end of its forward travel, the table 28 trips limit switch LS–2. LS–2 entergizes relay circuit RC–2, which energizes solenoid air valve SOL–2 which activates the two air cylinders 39 and 40 to move the table 30 downward to its second position, wherein the supported clamp arm gripping jaws 56 are loosely fitted around work-pieces 23.

The movement of table 30 into its second position trips limit switch LS–3 which energizes relay circuit RC–3 and solenoid air valve SOL–3 which activates cylinders 43—44 to move the cam bar 34 and attached cams 60 to their second positions wherein the clamp jaws 56 are made to close against the sides of work-pieces 23.

Figure 4:
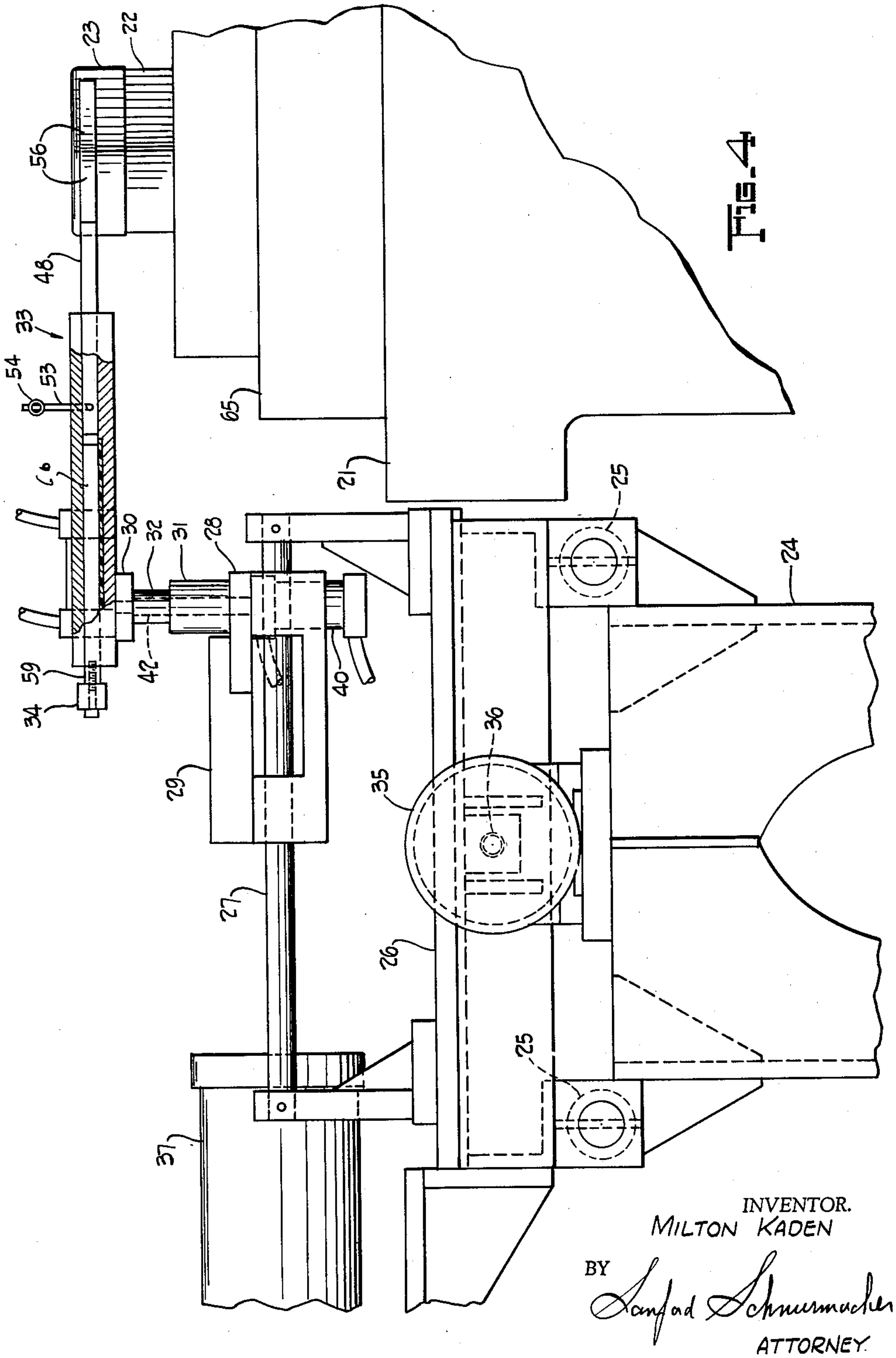
FIGURE 4 is a right, end view of the transfer device and machine tool.
Figure 5:
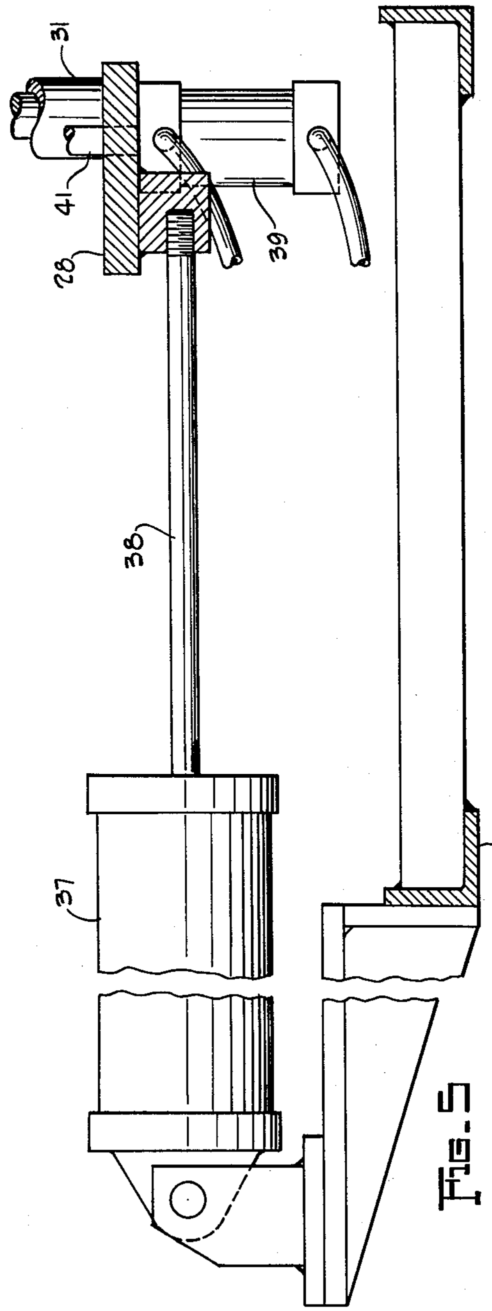
FIGURE 5 is a view, partly in section, taken along the line and in the direction of the arrows 5—5 of FIGURE 2.
Figure 6:
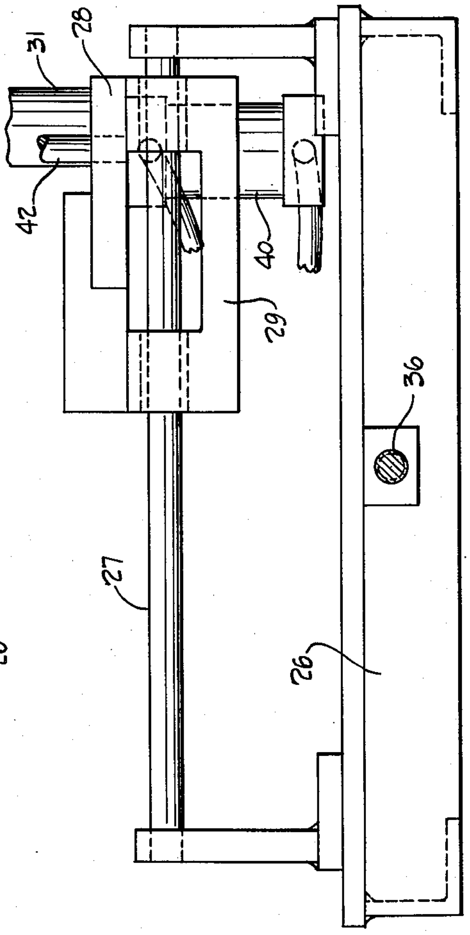
FIGURE 6 is an end view taken along the line and in the direction of the arrows 6—6 of FIGURE 2.

The movement of cam bar 34 to its second position trips limit switch LS–4 which energizes relay circuit RC–4, which in turn de-energizes relay circuit RC–2 and causes solenoid air valve SOL–2 to activate cylinders 39 and 40 to lift table 30 back to its first position, as seen most clearly in FIGURE 4. In this position the work-piece 23 is held in the gripping jaws 56 of arms 48 and 49 above and clear of the die station stake or mandrel 22.

Figure 2:
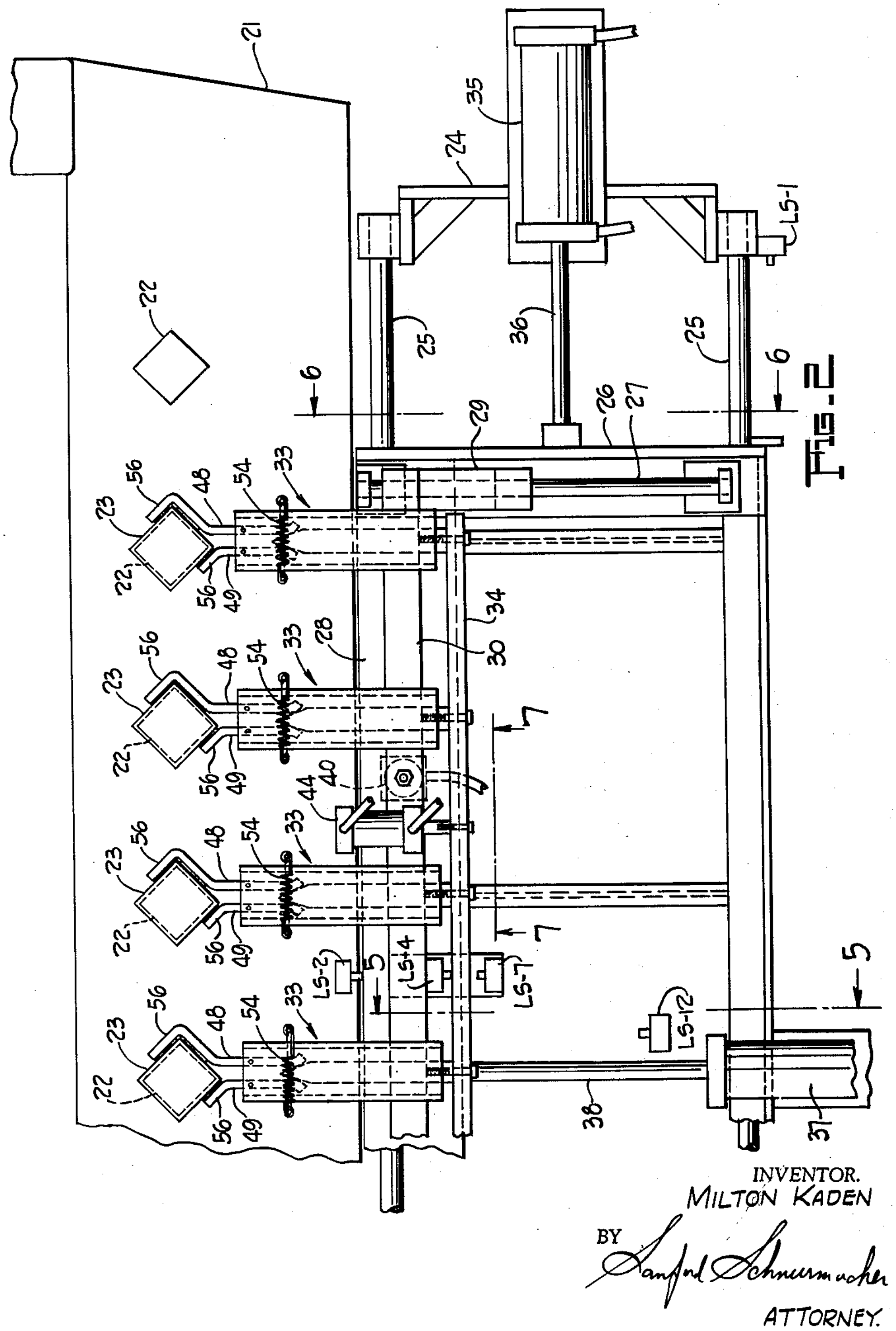
FIGURE 2 is an enlarged top plan view of the right portion of the device showing the work-piece transfer fingers in their maximum forward and advanced closed closed positions.

The movement of table 30 back to its first position trips limit switch LS–5, which energizes relay circuit RC–5, which in turn energizes solenoid air valve SOL–4, which acitvates air cylinder 35, which moves base table 26 to its second position, as seen in FIGURE 2. In this second position of table 26, the gripped work-pieces 23 are above and aligned with the die station mandrels 22 immediately to the left of their original stations.

The movement of table 26 to its second position trips limit switches LS–6, LS–11, and LS–10.

Limit switches LS–10, and LS–11 complete circuits so that the circuits of LS–6–7–8–12 may operate.

Limit switch LS–6 energizes relay circuit RC–6 which energizes solenoid air valve SOL–2, which in turn activates cylinders 39 and 40 to drop table 30 to its second position wherein the held work-pieces are positioned over their new station mandrels.

The movement of table 30 to its second position trips limit switch LS–9, which de-energizes relay circuit RC–3, which in turn de-energizes solenoid air valve SOL–3, which activates cylinders 43 and 44 to move the cam bar 34 back to its first position, opening the gripper fingers and depositing the work-pieces on the mandrels of their new stations. From FIGURE 2 it will be evident that each work-piece 23 has been moved one station to the left, leaving the first or right end station without a work-piece while the extreme left end work-piece, not shown, will be positioned clear of the last working station and deposited a completed work-piece delivery chute.

The movement of cam bar 34 back it its first position trips limit switch LS–7 energizing relay circuit RC–7, which de-energizes solenoid air valve SOL–2, which in turn activates cylinders 39 and 40 to lift table 30 back to its first position wherein the supported clamp arms are above and clear of their work-piece stations.

The movement of table 30 back to its first position trips limit switch LS–8, which in turn energizes relay circuit RC–8 which de-energizes solenoid air valve SOL–4 to activate cylinder 37 to retract table 28 to its first position wherein the gripper ends 56 are positioned laterally of the stations 22 and entirely clear of the punch press die and ram. At this point the punch press 21 goes into operation on the work-pieces.

At the same time movement of table 28 to its first position trips limit switch LS–12 which energizes relay circuit RC–12. RC–12 de-energizes solenoid air valve SOL–1, which activates cylinder 35 to pull base table back to its first position wherein limit switch LS–1 is tripped, setting up relay circuit RC–1 for a new cycle as soon as the punch press ram has been raised to its rest position, and conditions are again such as illustrated in FIGURE 3 with all the transfer device elements in their first positions.

As each cycle of the transfer device 20 is completed, the work-pieces 23 are moved progressively from station to station until, after completion, they are dropped beyond the last station into a delivery hopper or onto a conveyor belt, not shown. It should be noted that once the transfer cycle is started, the movements of the various elements in and of themselves initiate the next succeeding step until the full cycle is completed. With this transfer device, work-pieces can be lifted off an upstanding, work holding mandrel at one station into a plane above and clear of said mandrel and then transported in said raised plane to the next succeeding station, whereat they are lowered to the plane of and fitted over the work-holding mandrel of the next station.

The transfer device 20 can be set up to operate with any type of multi-stationed machine tool having stations arranged in a straight line and with front clearance; and need not necessarily be built as an integral part of such a complex machine tool.

It will now be clear that there is provided a device which accomplishes the objectives heretofore set forth.

While the invention has been disclosed in its preferred form, it is to be understood that the specific embodiment thereof as described and illustrated herein is not to be considered in a limited sense as there may be other forms or modifications of the invention which should also be construed to come within the scope of the appended claims.

I claim:

1. In combination with a multi-stationed machine tool of the type having linearly spaced work stations open to the front and including upstanding work-piece holding mandrels at each station, a transfer device, comprising, a base member extending longitudinally of the machine tool bed, adjacent the work stations; a first table mounted on the base and movable longitudinally thereof along the front edge of the machine tool bed; a second table mounted on the first table and movable cross-wise thereof; a longitudinally extending third table mounted on the second table and movable vertically thereof; a plurality of laterally extending clamp members, having terminal gripper fingers, mounted on the third table in lineal spaced relation matching that of the work-station mandrels; the first table being movable in a horizontal plane between a first position wherein the clamp members are aligned with all the work stations, and a second position wherein the clamp members are aligned with the stations immediately adjacent to those with which they were aligned when the table was in its first position; a first pneumatic cylinder mounted on the base member, having its piston rod connected to the first table, the piston rod being movable between first and second positions, the table being in its first position when the piston rod is in its first position, and in its second position when the piston rod is in its second position; the second table being movable in a horizontal plane on the first table between a first, retracted position wherein the clamp member gripper fingers are withdrawn from the work stations, and a second, advanced position wherein the gripper fingers are vertically aligned with the work stations; a second pneumatic cylinder mounted on the first table having its piston rod connected to the second table, the piston rod being movable between first and second positions, the second table being in its first position when the piston rod is in its first position and in its second position when the piston rod is in its second position; the third table being movable in a vertical plane, relative to the second table, between a first, raised position wherein the clamp member gripper fingers are above the horizontal plane of the work stations, and a second, lowered position wherein they are in the plane of the work stations; a third pneumatic cylinder mounted on the second table having its piston rod connected to the third table, the piston rod being movable between first and second positions, the third table being in its first position when the piston rod is in its first position and in its second position when the piston rod is in its second position; the clamp member gripper fingers being movable relative to each other between a first, open position and a second, closed position wherein they are drawn together to clamp upon a work piece located within their grasp; a fourth pneumatic cylinder mounted on the third table having its piston rod connected to the clamp member gripper fingers, the piston rod being movable between first and second positions, the gripper fingers being in their first positions when the piston rod is in its first position, and in their second positions when the piston rod is in its second position; each of said pneumatic cylinders having electrically operated valve means and control circuits therefor, operable to energize the cylinders to cause the pistons thereof to move between their first and second positions in a predetermined sequence; and an electric cycling circuit controlled by the machine tool and acting to initiate the workpiece transfer cycle when the machine tool is in its rest position.

2. A device of the type defined in claim 1 and further characterized by the clamp members, comprising in combination, a case member having an open front end; a pair of spaced and opposed arm members pivotally mounted within the case and extending through the front end thereof, said arms having opposed gripper fingers at their outer ends and opposed cam follower surfaces at their inner ends; arms being pivotable between a first, or open position wherein the cam follower surfaces are in contact and the gripper fingers tilted away from each other, and a second, or closed position wherein the cam follower surfaces are spaced apart and the gripper fingers inclined toward each other; spring means engaged with the arms proximate their inner ends and acting to normally bias the arms to their first position; and an operating cam slidably mounted in the case to the rear of the cam follower surfaces of the clamp arms, and connected to the aforesaid fourth pneumatic cylinder; the cam being movable by said cylinder between a first, retracted position to the rear of the clamp arm cam follower surfaces and a second, advanced position between the said cam follower surfaces, the clamping arms being in their first position when the operating cam is in its first position, and in their second position when the operating cam is in its second position.

References Cited in the file of this patent

UNITED STATES PATENTS

| | | |
|---|---|---|
| 1,933,225 | Smith | Oct. 31, 1933 |
| 1,971,110 | Lhoest | Aug. 21, 1934 |
| 2,598,222 | Cahners | May 27, 1952 |
| 2,909,265 | De Buigne | Oct. 20, 1959 |
| 2,929,484 | Longdon | Mar. 22, 1960 |
| 2,929,485 | Wallis | Mar. 22, 1960 |